United States Patent [19]

Hosaka et al.

[11] 4,370,384
[45] Jan. 25, 1983

[54] MAGNETIC RECORDING MEDIUM

[75] Inventors: Akihiko Hosaka; Yukihiro Isobe; Kiyotaka Okuyama, all of Tokyo, Japan

[73] Assignee: TDK Electronics Co., Ltd., Tokyo, Japan

[21] Appl. No.: 306,665

[22] Filed: Sep. 29, 1981

[30] Foreign Application Priority Data

Oct. 3, 1980 [JP] Japan .................................. 55-137812

[51] Int. Cl.³ .............................................. G11B 5/68
[52] U.S. Cl. ............................... 428/425.9; 252/62.54; 360/134; 478/482; 478/694; 478/900
[58] Field of Search ................ 428/694, 695, 900, 482, 428/425.9; 427/128; 252/62.54; 360/134, 135, 136

[56] References Cited

U.S. PATENT DOCUMENTS 3,840,400 10/1974 Yamada et al. .................. 252/62.54
4,241,139 12/1980 Kubota et al. ...................... 428/413
4,307,154 12/1981 Hosaka et al. ...................... 428/694
4,329,398 5/1982 Hosaka et al. ...................... 428/694

FOREIGN PATENT DOCUMENTS 2143315 2/1973 France ................................ 427/128
44-18222 8/1969 Japan .................................. 427/128
54-151412 11/1979 Japan .................................. 428/900
54-151417 11/1979 Japan .................................. 428/900
55-5171 2/1980 Japan .................................. 427/128

Primary Examiner—Stanley S. Silverman
Attorney, Agent, or Firm—Oblon, Fisher, Spivak, McClelland & Maier

[57] ABSTRACT

A magnetic recording medium having a substrate coated with a magnetic layer comprising a magnetic powder and a binder essentially consisting of 20 to 70 wt. % of a polyester resin, 80 to 30 wt. % of a vinyl chloride-vinylidene chloride copolymer and a polyisocyanate.

3 Claims, 2 Drawing Figures

MAGNETIC RECORDING MEDIUM

BACKGROUND OF THE INVENTION

1. Field of the Invention

The present invention relates to a magnetic recording medium which is prepared by forming a magnetic layer on a substrate by coating a magnetic powder composition comprising a magnetic powder and a binder as main components. More particularly, it relates to a magnetic recording medium having excellent repeat running durability and excellent output variation which is suitable for an audio tape and a video tape.

2. Description of the Prior Art

In general, a magnetic recording medium is prepared by coating a magnetic powder composition of a magnetic powder and a binder on a support such as a film made of polyacetate, polyvinyl chloride, polyester etc.

Various kinds of the binder have been proposed to use in the magnetic powder composition. However, a magnetic recording medium having both satisfactory characteristics of the output variation and the repeat running durability has not been found.

The typical binders which have been used in the conventional magnetic recording medium, are combinations of an urethane resin, a vinyl chloride-vinyl acetate copolymer, a cellulose resin, an epoxy resin or a phenoxy resin. Both the characteristics could not be satisfied by the conventional combinations of the resins. The thermoplastic resins have been mainly used as the binder of the combination. Thus, the preparation and the handling of the magnetic powder composition have been advantageously simple. However, when the magnetic recording medium is prepared by using the binder, the coated layer has been easily swollen by the effect of an organic solvent and it had not satisfactory temperature and humidity resistances, and the reliability for the storage of recorded data has been low whereby a high density recording could not be expected. This is serious disadvantage.

SUMMARY OF THE INVENTION

It is an object of the present invention to overcome the aforementioned disadvantages and to provide a magnetic recording medium having both satisfactory characteristics of the output variation and the repeat running durability.

The foregoing and other objects of the present have been attained by providing a magnetic recording medium having a substrate coated with a magnetic layer comprising a magnetic powder and a binder essentially consisting of 20 to 70 wt.% of a polyester resin, 80 to 30 wt.% of a vinyl chloride-vinylidene chloride copolymer and a polyisocyanate.

DETAILED DESCRIPTION OF THE PREFERRED EMBODIMENTS

Figure 1:
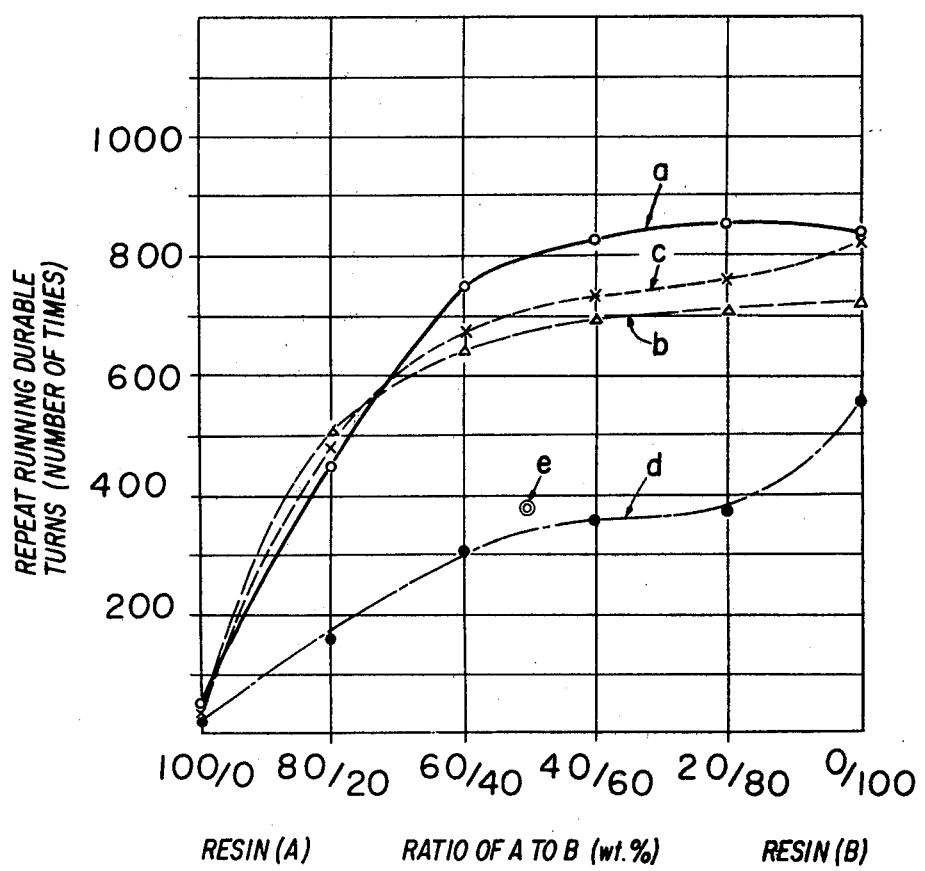
FIG. 1 is a graph showing repeat running durable turns of samples obtained in examples of the present invention and references.

The present invention is to provide a magnetic recording medium having a substrate coated with a magnetic layer obtained by dispersing a magnetic powder in a binder which comprises a polyester resin and a vinyl chloride-vinylidene chloride copolymer at a ratio of 7:3 to 2:8 and also comprises a polyisocyanate. It provides the magnetic recording medium having excellent repeat running durability and excellent output variation which is suitable for an audio tape and a video tape.

The polyester resin can be commercially available polyester resins as a binder such as Nippolan 1004, 2006 and 4032 (Nippon Polyurethane Co.); Desmophene 650, 800, 1100 and 1700 (Bayer AG); Bairon 200, 300, 500 and 53S (Toyo Boseki Co.). Saturated or unsaturated linear polyesters for a binder are preferably used and are described in Encyclopedia of Polymer Science and Technology. The properties of the typical polyester resins are shown in Table.

TABLE

| Polyester | OH value | Acid value | Solid (%) | Viscosity (cps/75° C.) |
| --- | --- | --- | --- | --- |
| Desmophen 800 | 280–300 | <4 | 100 | 2200–3800 |
| Desmophen 800-75E | 207–228 | <3 | 74–76 | H ~ P (Gardner) |
| Desmophen 1100 | 205–221 | <4 | 100 | 550–750 |
| Desmophen 1100-75E | 150–170 | <3 | 74–76 | D ~ H (Gardner) |
| Desmophen 2200 | 57–64 | <2 | 100 | 925–1075 |
| Nippolan 1004 | 37–45 | <2 | 100 | 600–900 |
| Nippolan 2006 | 375–425 | <10 | 100 | 7000–17000 |
| Nippolan 3023 | 158–176 | <4 | 100 | 350–550 |

| Polyester resin | Intrinsic viscosity | Molecular weight | Melting point (°C.) |
| --- | --- | --- | --- |
| Bairon 200 | 0.53 | 15000–20000 | 180–200 |
| Bairon 300 (Interplasticized) | 0.68 | 15000–20000 | 140–160 |

The polyester resin is used at a ratio of 20 to 70 wt.% based on a total of the polyester and the vinyl chloride-vinylidene chloride copolymer. When the ratio of the polyester resin is less than 20 wt.%, the magnetic layer is hard and brittle though the repeat running durability is excellent. Therefore, the adhesive strength of the base film and the support is inferior to be easily peeled off and the sound damage (jumping) is caused and moreover, the irregular touch of the magnetic head is caused to disadvantageously increase the output variation.

The vinyl chloride-vinylidene chloride copolymer used in the present invention can be commercially available vinyl chloride-vinylidene chloride copolymers such as "#1000W" and "#1000WK" manufactured by Denki Kagaku Kogyo Co. Ltd. The vinyl chloride-vinylidene chloride copolymers for a binder are described in Encyclopedia of Polymer Science and Technology.

The vinyl chloride-vinylidene chloride copolymer is used at a ratio of 80 to 30 wt.% based on a total of the polyester and the vinyl chloride-vinylidene chloride copolymer. When the ratio of the vinyl chloride-vinylidene chloride copolymer is less than 30 wt.%, a soft magnetic layer is formed though the adhesive strength is improved. Therefore, a running friction is high and creak sound is caused and an abnormal running is caused whereby the output variation is too high to use in a practical application.

It is necessary to incorporate a small amount of a polyisocyanate to the combination of the polyester resin and the vinyl chloride-vinylidene chloride copolymer at the specific ratio.

The polyisocyanate added for the purpose can be commercially available polyisocyanates such as "Colonate L", "Colonate HL", "Colonate 2036" manufactured by Nippon Polyurethane Co. and "Desmodule L" manufactured by Bayer A.G.

The polyisocyanate for the crosslinking agent is incorporated at a ratio of 5 to 30 wt.% preferably 10 to 25 wt.% based on the total resin components.

The magnetic powder composition is prepared by using the resin as the binder and a solvent and dispersing a magnetic powder with a dispersing agent, a lubricant and other additives and adding a crosslinking agent such as a polyisocyanate with stirring. The magnetic powder composition is coated on a substrate such as a polyester film to form a magnetic layer having a desired thickness such as about 6μ. When the content of the crosslinking agent is less than 5 wt.%, the crosslinking effect is not enough whereas when it is more than 300 wt.%, the adhesive strength to the base film is inferior and the magnetic layer is brittle. Therefore, the content of the crosslinking agent is preferably in a range of 5 to 30 wt.% based on the total amounts of the resins.

The resulting magnetic recording medium has excellent electromagnetic transfer characteristic and excellent physical characteristics such as repeat running durability and adhesive strength.

The kinds of the magnetic powder, the solvent and the additives and the preparation of the magnetic layers and the conditions and well-known in this field and accordingly, they are not repeated in this specification.

The present invention will be illustrated by certain examples and references which are provided for purposes of illustration only and are not intended to be limiting the invention.

EXAMPLE 1

| | |
|---|---|
| Co-adsorbed $\gamma$-Fe$_2$O$_3$: | 400 wt. parts |
| Dispersing agent (Lecithin): | 8 wt. parts |
| Polyester resin (Nippolan 1004 manufactured by Nippon Polyurethan Co.): | A wt. parts |
| Vinyl chloride-vinylidene chloride copolymer (#1000W manufactured by Denki Kagaku Kogyo): | B wt. parts |
| Lubricant: { Myristic acid 3 wt. parts, Butyl myristate 2 wt. parts } | 5 wt. parts |
| Methyl ethyl ketone: | 400 wt. parts |
| Methyl isobutyl ketone: | 200 wt. parts |
| Cyclohexanone: | 200 wt. parts |

The components were thoroughly mixed by a disperser for paint, and polyisocyanate (Colonate L manufactured by Nippon Polyurethane Co.) was incorporated at a ratio of 12 wt.% based on the total amounts of the resins and the mixture was stirred to be uniform to prepare a magnetic powder composition. The composition was coated in a thickness of 3μ on a polyethyleneterephthalate film having a thickness of 6μ. The surface of the coated layer was processed by a super calender treatment and cured by heating it at about 60° C. for 40 hours. The product was cut in a width of ⅛ inch to prepare each magnetic recording tape.

Magnetic recording tapes were prepared by using the polyester resin and the vinyl chloride-vinylidene chloride copolymer at various ratios.

The repeat running durable turns and the output variation of each magnetic recording tape were measured. The results are respectively described in FIGS. 1 and 2 as "a".

REFERENCE 1

Figure 2:
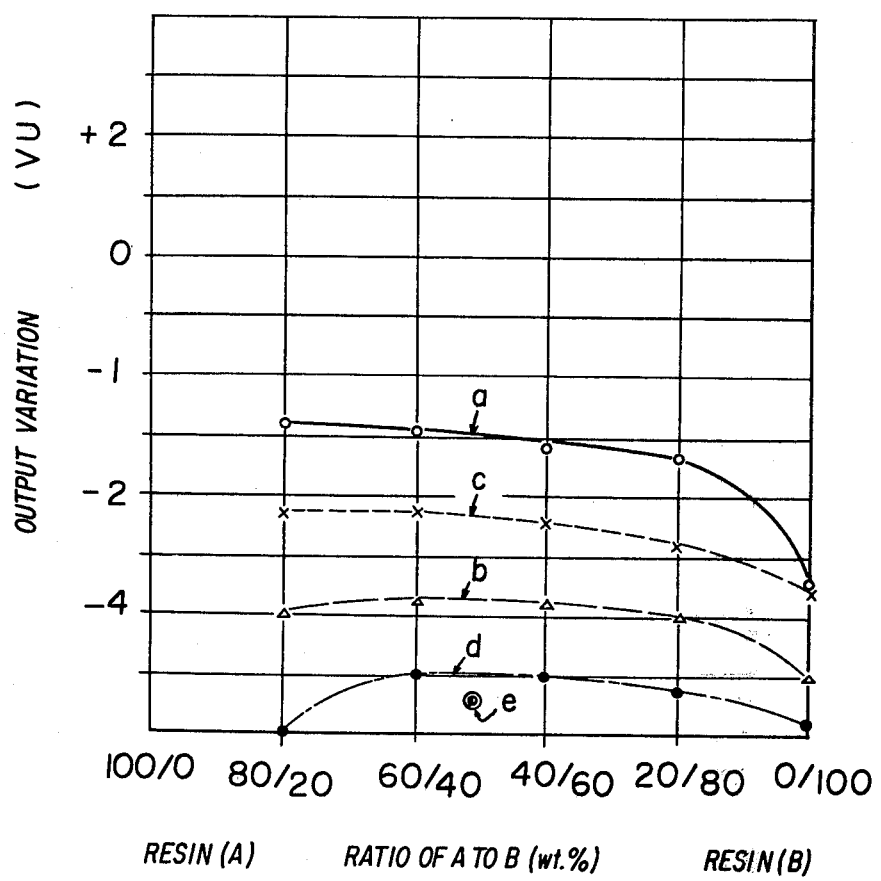
FIG. 2 is a graph showing output variations of the samples.

In accordance with the process of Example 1 except using nitrocellulose (H ½ second manufactured by Asahi Kasei K.K.) instead of the vinyl chloride-vinylidene chloride copolymer, magnetic recording tapes were prepared and the repeat running durable turns and the output variation of each magnetic recording tape were measured. The results are shown in FIGS. 1 and 2 as "b".

REFERENCE 2

In accordance with the process of Example 1 except using polyurethane resin (Nippolan 3032 manufactured by Nippon Polyurethane Co.) instead of polyester resin, magnetic recording tapes were prepared. The samples are shown as "c".

REFERENCE 3

In accordance with the process of Example 1 except eliminating the polyisocyanate as the crosslinking agent, magnetic recording tapes were prepared. The samples are shown as "d".

REFERENCE 4

In accordance with the process of Example 1 except using only vinyl chloride-vinyl acetate copolymer (VAGH manufactured by UCC) as the binder, magnetic recording tapes were prepared. The samples are shown as "e". Only single resin was used as the binder. Thus, the characteristics are shown at the position of the ratio of 50:50.

As it is clearly found by the results shown in FIGS. 1 and 2, the samples a of the present invention had excellent repeat running durable turns and excellent output variation in a range of the ratio of the polyester resin to the vinyl chloride-vinylidene chloride copolymer of 7:3 to 2:8.

The output variation was measured by recording the signal having the frequency of 8 KHz in each resulting magnetic recording tape and the variation of the reproduced output in the reproduction after durable-running for 5 times by VU tester.

The creak sound and the running fluctuation were caused in the cases of the ratio of the polyester resin A of 80 to 100 wt.% and accordingly, the output variation could not be precisely measured. The data are not shown.

The magnetic recording medium of the present invention has excellent repeat running durability and also excellent output variation which could not be attained by using the conventional binders. (The output variation is usually the reverse property to the repeat running durability.)

In the example, Co-adsorbed $\gamma$-Fe$_2$O$_3$ was used as the magnetic powder. It is possible to use $\gamma$-Fe$_2$O$_3$, Fe$_3$O$_4$ and Co-adsorbed Fe$_3$O$_4$ as the magnetic powder.

It is also possible to incorporate suitable additives such as fatty acids such as myristic acid, palmitic acid, stearic acid and behenic acid; silicone oil such as dimethyl siloxane, antistatic agents such as metal soaps and quaternary ammonium salts, dispersing agents such as fatty acid esters, phosphoric acid esters and higher alcohols.

We claim:

1. In a magnetic recording medium having a substrate coated with a magnetic layer comprising a magnetic powder and a binder, the improvement characterized in that said binder in said magnetic layer consists essentially of 20 to 70 wt.% of a polyester resin, 80 to 30 wt.% of a vinyl chloride-vinylidene chloride copolymer and a polyisocyanate.

2. The magnetic recording medium according to claim 1 wherein said polyisocyanate is incorporated in a range of 5 to 30wt.% based on the total amounts of said resins.

3. The magnetic recording medium according to claim 1 wherein said magnetic recording medium is a magnetic recording tape or sheet.

* * * * *